Aug. 14, 1923.
J. M. RUSNAK
1,464,542
ADJUSTABLE ARM FOR MULTIPLE SPINDLE DRILLS
Filed June 5, 1922
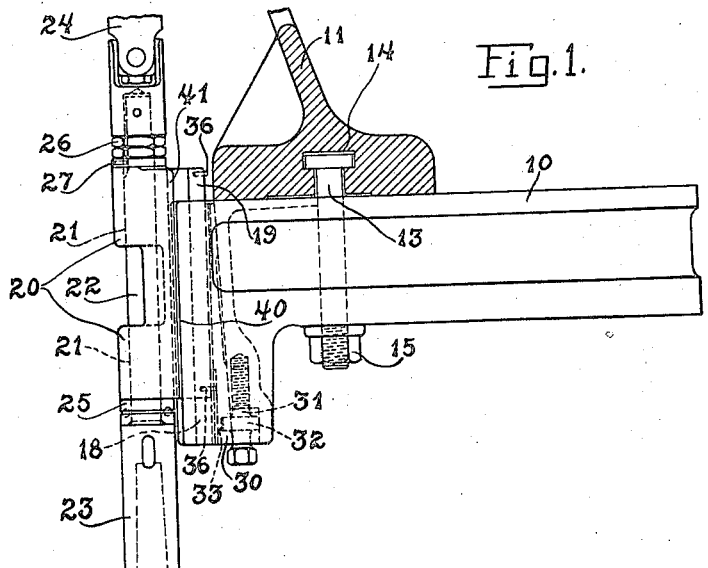
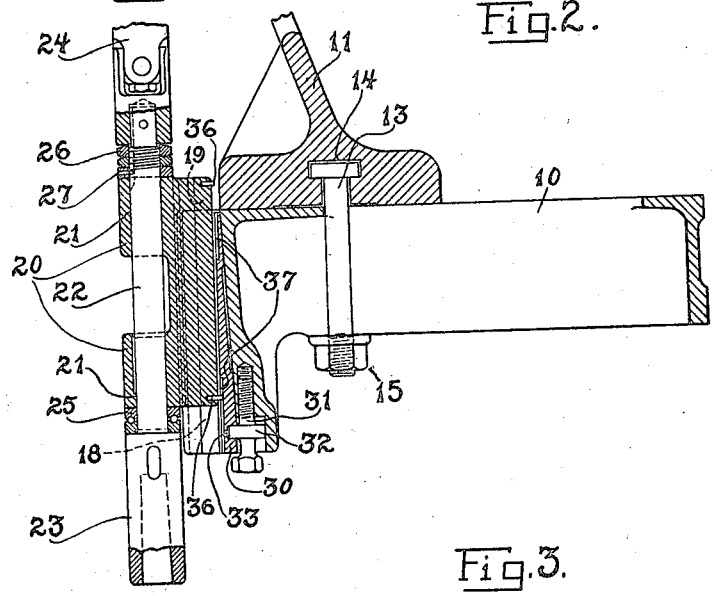
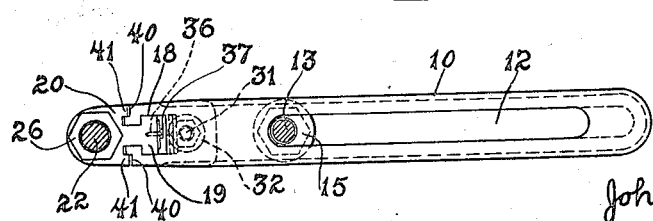
INVENTOR
John M. Rusnak
BY
Joseph N. Schofield
ATTORNEY Patented Aug. 14, 1923.

1,464,542

UNITED STATES PATENT OFFICE.

JOHN M. RUSNAK, OF HARTFORD, CONNECTICUT, ASSIGNOR TO PRATT & WHITNEY COMPANY, OF NEW YORK, N. Y., A CORPORATION OF NEW JERSEY.

ADJUSTABLE ARM FOR MULTIPLE-SPINDLE DRILLS.

Application filed June 5, 1922. Serial No. 566,165.

*To all whom it may concern:*

Be it known that I, JOHN M. RUSNAK, a citizen of the United States, residing at Hartford, in the county of Hartford and State of Connecticut, have invented certain new and useful Improvements in Adjustable Arms for Multiple-Spindle Drills, of which the following is a specification.

This invention relates to an adjustable drill supporting arm and particularly to an adjustable arm adapted to carry one spindle of a multiple spindle drill.

An object of the present invention is to provide an improved arm construction permitting ready adjustment and clamping of a spindle head mounted thereon.

One feature which enables me to accomplish the above object is that I provide a T-shaped recess in the end of the arm to which the drill spindle head is to be adjusted, this T-slot or recess extending at right angles to the guiding surface of the arm.

Another feature which is advantageous is that I adjustably mount the drill head carrying a drill spindle within this T-slot and provide an adjustable wedge member interposed between the arm and spindle head to securely hold said drill head in any desired vertical position relative to the arm.

Another object of the invention is to so mount the adjusting means for the wedge that it may be readily moved by operation of a single screw threaded member to clamp or unclamp the spindle head.

With these and other objects in view, my invention consists in the features of construction and operation set forth in the following specification and illustrated in the accompanying drawing.

In the accompanying drawing annexed hereto and forming a part of this specification, I have shown my invention embodied in a spindle carrying arm for a vertical multiple spindle drilling machine but it will be understood that the invention may be otherwise embodied and that the drawings are not to be construed as defining or limiting the scope of the invention, the claims appended to this specification being relied upon for that purpose.

In the drawing:

Figure 1 is an elevation of the arm and spindle carrying head.

Fig. 2 is a vertical central section of the same.

Fig. 3 is a plan view.

In the above mentioned drawing, I have shown but one modification of the invention which is now deemed preferable but it is to be understood that changes and modifications may be made within the scope of the appended claims without departing from the spirit of the invention.

Briefly, my invention in its broadest aspect comprises the following principal parts: first, an elongated arm adapted to be adjustably attached to the drill head of a multiple spindle drilling machine; second, a spindle head slidably mounted at one end of the arm; third, a T-shaped slot or recess in said arm engaging a T-shaped projection on the spindle head; fourth, a wedge block adapted to enter a portion of the T-shaped recess and engage a rear vertical surface of the projection on the spindle head; fifth, adjusting means to operate said wedge to clamp and unclamp said spindle head; and sixth, interengaging portions on the arm and head to prevent distortion of the walls of the arm.

Referring more in detail to the figures of the drawing, I provide an arm 10 which generally is of the type used in multiple spindle drilling machines and which is adapted to be adjustably attached to the drill head 11, a portion only of which is shown in Fig. 1. As shown, the adjusting means for this arm relative to the drill head comprises an elongated slot 12 extending longitudinally of the arm 10 through which passes a bolt 13 the head of which enters a recess provided in the drill head 11. By tightening or loosening a nut 15 provided on this adjusting bolt 13, the arm 10 may be moved to any desired position and clamped securely therein. At one end of the arm 10 is provided a vertical T-shaped slot or recess 18 which is engaged by an extension 19 provided on the spindle head 20.

The spindle head 20 is provided with a vertical hole 21 through which a drill spindle 22 may extend and be rotated. This drill spindle 22 is shown in Fig. 1 comprising at the lower end a drill retaining socket 23 and at its upper end a universal or other type of joint 24 through which the spindle 22 may be rapidly rotated. Preferably, a ball thrust bearing 25 is provided between the drill retaining socket 23 and the lower surface of the spindle head 20, and near the upper end of the drill spindle 22 adjusting nuts 26 and a washer 27 are provided to hold the spindle 22 from axial movement within the head 20. This construction is usual in multiple spindle drills particularly in vertical drills and further description of the operation and adjustment of the drill spindle within its head will be unnecessary.

In order to attach the spindle head 20 adjustably to the arm 10 in such a manner that it may be clamped in any desired vertical position relative to the arm, I provide the following special means. It is obvious that this adjustment must be provided so that each independent spindle 22 of the multiple drill may be so positioned that the cutting ends of the drills within their respective spindles will be properly disposed relative to the work being operated on. It is also necessary to compensate for different lengths of drills in the different independent spindles.

This adjustable clamping means comprises the longitudinal T-shaped projection 19 extending substantially the entire length of the spindle head and is adapted to enter the T-shaped slot or recess 18 in the forward end of the arm. As shown in Fig. 2 of the drawing, the slot or recess 18 is tapered, being deeper at the bottom than at the top. This is accomplished by inclining the inner or bottom wall of the recess. As the projection 19 is of uniform cross section throughout its length, it will be seen that the space between the projection and the wall of the recess will be tapered and wider at the bottom than at the top. Preferably, and as shown in the figures, the projection 19 does not entirely fill the T-shaped tapered or inclined recess 18 but provides a space of material width in rear of the projection. Within this space thus provided within the recess, I mount a wedge 30 engaging the rear flat surface of the projection 19 and also the rear wall of the recess 18 which may be suitably inclined so that the forward face of the wedge 30 extends vertically. It will be seen from this construction that by moving the wedge 30 vertically upward, the spindle head 20 will be securely clamped in any desired adjusted position and that by lowering the wedge 30 slightly the spindle head 20 may be manually adjusted.

In order to conveniently adjust this wedge 30, I provide a screw 31 extending vertically within the arm 10 adjacent its forward end which has an integral collar 32 thereon. This collar or head 32 engages a milled slot 33 in the wedge 30. Rotation, therefore, of this screw 31 moves the wedge vertically in either direction.

In order to limit the maximum adjustment of the spindle head, I insert pins 35 near the upper and lower ends of the T-shaped projection on the spindle head 20. I also provide recesses 37 extending longitudinally of the forward surface of the wedge permitting these pins to extend therein. By this means, the spindle head 20 may be adjustably positioned within certain extreme limiting positions governed by the length of the slots within the wedge.

As shown most clearly in Fig. 3, the forward vertical surface of the arm 10 has the opposite sides cut away as shown at 40 and the spindle head is provided on opposite sides with slight projections 41 so that the opposite sides of the forward extending projections 40 of the arm 10 engage the lateral sides of the projections 41 on the spindle head 20. By these means any tendency for the two opposite portions of the forward end of the recess 18 is prevented by these sides engaging the projections on the spindle head.

What I claim is:

1. An adjustable supporting device for a drill spindle comprising in combination, an arm, means to attach said arm to a drill head, a spindle head rotatably supporting a drill spindle adjustably attached at one end of said arm, and a wedge interposed between said arm and spindle head adapted to clamp said spindle head in any adjusted position.

2. An adjustable supporting device for a drill spindle comprising in combination, an arm, means to attach said arm to a drill head, a spindle head rotatably supporting a drill spindle adjustably attached at one end of said arm, a wedge interposed between said arm and spindle head adapted to clamp said spindle head in any adjusted position, and means to move said wedge to clamp or unclamp said head.

3. An adjustable supporting device for a drill spindle comprising in combination, an arm, means to attach said arm to a drill head, a spindle head rotatably supporting a drill spindle adjustably attached at one end of said arm, a wedge interposed between said arm and spindle head and adapted to clamp said spindle head in any adjusted position, and screw threaded means to move said wedge to clamp or unclamp said head.

4. An adjustable supporting device for a drill spindle comprising in combination, an arm, means to attach said arm to a drill head, a spindle head rotatably supporting a drill spindle vertically adjustable at one end of said arm, a projection on said spindle head adapted to enter a recess provided in said arm, and an adjustable wedge within said recess adapted to engage said projection to clamp said spindle head in any desired vertical position.

5. An adjustable supporting device for a drill spindle comprising in combination, an arm, means to attach said arm to a drill head, a spindle head rotatably supporting a drill spindle vertically adjustable at one end of said arm, a T-shaped projection on said spindle head adapted to enter a correspondingly shaped recess provided in said arm, and an adjustable wedge within said recess adapted to engage said projection to clamp said spindle head in any desired vertical position.

6. An adjustable supporting device for a drill spindle comprising in combination, an arm, means to attach said arm to a drill head, a spindle head rotatably supporting a drill spindle vertically adjustable at one end of said arm, a projection on said spindle head adapted to enter a recess provided in said arm, and an adjustable wedge within said recess adapted to engage the rear face of said projection to clamp said spindle head in any desired vertical position, and means to move said wedge to clamp or unclamp said head.

7. An adjustable supporting device for a drill spindle comprising in combination, an arm, means to detachably and adjustably mount said arm in operative position on a drill head, guideways at one end of said arm, a spindle head rotatably supporting a drill spindle slidably mounted in said guideway, an adjustable wedge member interposed between said arm and spindle head and adapted to clamp said spindle head in any adjustable position, and projections on the rear face of said spindle head engaging lateral surfaces on said arm whereby the forward end of said arm is retained in position.

In testimony whereof, I hereto affix my signature.

JOHN M. RUSNAK.